(12) United States Patent
Song et al.

(10) Patent No.: US 11,378,401 B2
(45) Date of Patent: Jul. 5, 2022

(54) POLARIZATION-MAINTAINING FULLY-RECIPROCAL BI-DIRECTIONAL OPTICAL CARRIER MICROWAVE RESONANCE SYSTEM AND ANGULAR VELOCITY MEASUREMENT METHOD THEREOF

(71) Applicant: ZHEJIANG UNIVERSITY, Hangzhou (CN)

(72) Inventors: Kaichen Song, Hangzhou (CN); Jinlong Yu, Hangzhou (CN); Lingyun Ye, Hangzhou (CN); Ju Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/244,962

(22) Filed: Apr. 30, 2021

(65) Prior Publication Data
US 2022/0082385 A1 Mar. 17, 2022

Related U.S. Application Data

(63) Continuation of application No. PCT/CN2018/113212, filed on Oct. 31, 2018.

(51) Int. Cl.
*G01C 19/72* (2006.01)
*G01J 4/04* (2006.01)

(52) U.S. Cl.
CPC ............ *G01C 19/727* (2013.01); *G01J 4/04* (2013.01)

(58) Field of Classification Search
CPC ................................ G01C 19/727; G01J 4/04
See application file for complete search history.

(56) References Cited

U.S. PATENT DOCUMENTS 9,568,319 B2\* 2/2017 Song .................... G01C 19/727
2007/0086015 A1 4/2007 Sanders et al.
2022/0034660 A1\* 2/2022 Song .................... G01C 19/722

FOREIGN PATENT DOCUMENTS

CN 103267521 A 8/2013
CN 103267522 A 8/2013
(Continued)

OTHER PUBLICATIONS

Kudelin, I.; Sugavanam, S.; Chernysheva, M. Rotation Active Sensors Based on Ultrafast Fibre Lasers. Sensors 2021, 21, 3530. (Year: 2021).\*

(Continued)

*Primary Examiner* — Hwa Andrew Lee
(74) *Attorney, Agent, or Firm* — W&G Law Group

(57) ABSTRACT

A polarization-maintaining fully-reciprocal bi-directional optical carrier microwave resonance system and an angular velocity measurement method thereof. In the system, highly stable optical carrier microwaves are generated in a clockwise direction and a counterclockwise direction in the same resonant cavity, and are used to measure the angular velocity of rotation of a carrier apparatus. A fully reciprocal ring-shaped resonant cavity structure is used to achieve a fully reciprocal bi-directional optical resonance system. A polarization state separation technique is used to separate an optical signal into two wavelengths, and optical signals with perpendicular polarization states are transmitted in opposite directions in a sensing ring, thereby improving the measurement capability of the sensing ring. Bi-directional optical carrier microwave resonance is achieved by using a phase tracking structure and a regenerative mode locking technique. A cavity length control technique is used to lock the oscillation frequency of microwaves in one of the directions to a highly stable standard time reference source, thereby achieving a stable relative cavity length of an optical reso- (Continued)

nant cavity. The described key techniques greatly improve the signal-to-noise ratio of bi-directional oscillation difference frequency signals caused by the Sagnac effect. The system and the method are practical and have high measurement precision.

10 Claims, 2 Drawing Sheets

(56) References Cited

FOREIGN PATENT DOCUMENTS

| | | |
|---|---|---|
| CN | 103278150 A | 9/2013 |
| CN | 103471579 A | 12/2013 |

OTHER PUBLICATIONS

International Search Report (PCT/CN2018/113212); dated Jun. 18, 2019.
"A New Scheme of Measuring Sagnac Effect Based on Microwave Resonant" (Wu, Qiong et al.) [Feb. 28, 2015].

* cited by examiner

POLARIZATION-MAINTAINING FULLY-RECIPROCAL BI-DIRECTIONAL OPTICAL CARRIER MICROWAVE RESONANCE SYSTEM AND ANGULAR VELOCITY MEASUREMENT METHOD THEREOF

TECHNICAL FIELD

The present disclosure is in the field of high precision optical gyroscope technology and in particular relates to a polarization-maintaining full-reciprocity bidirectional microwave-over-fiber resonant system and a method of detecting an angular velocity by using the polarization-maintaining full-reciprocity bidirectional microwave-over-fiber resonant system.

BACKGROUND

High precision inertial devices are the foundation for high precision positioning and navigation of carriers. High precision gyroscopes are mainly classified into two categories of mechanical gyroscopes and optical gyroscopes, which can detect carrier operating attitudes. Thus, the high precision gyroscopes can be widely used in various field such as military, industry, and science. Comparing with mechanical gyroscopes, the optical gyroscopes have short research times. Although the optical gyroscopes have features such as a compact structure and a high sensitivity, drawbacks thereof are evident. The laser gyroscope has a high accuracy, but there is severe latching effect in operation and the cost thereof is high. Fiber optic gyroscopes are mainly classified into two categories of interferometric fiber optic gyroscopes and resonant fiber optic gyroscopes. The interferometric fiber optic gyroscopes have low gyroscopic accuracy due to factors such as temperature and vibration errors. The resonant fiber optic gyroscopes have a reduced interferometric noise, but has a higher demand on the device and currently the practicability thereof is to be improved.

The basic principle of detecting a rotational angular velocity of a carrier by the laser gyroscope and the fiber optic gyroscope is Sagnac effect. Since the phase difference or frequency difference created under the Sagnac effect is only related to the rotational angular velocity of the carrier, independent of the system structure, the rotational angular velocity can be indirectly measured by detecting the phase difference or frequency difference between two light beams emitted by the same light source in clockwise (CW) and counterclockwise (CCW) directions. To guarantee detection accuracy, two light beams transmitted in the clockwise (CW) and counterclockwise (CCW) directions need to have strict reciprocity. That is, two light beams transmitted in the clockwise (CW) and counterclockwise (CCW) directions need to be equivalent in terms of structure and performance when transmitted in clockwise and counterclockwise resonant cavities. Therefore, high precision full-reciprocity optical gyroscopes are still the focus of research for optical gyroscopes.

SUMMARY

It is an object of the present disclosure to overcome the shortcomings of angular velocity measurement schemes of the conventional optical gyroscope and to provide a polarization-maintaining full-reciprocity bidirectional microwave-over-fiber resonant system and a method of detecting an angular velocity by using the polarization-maintaining full-reciprocity bidirectional microwave-over-fiber resonant system.

In order to achieve the above object, the present disclosure employs the following technical solution. A polarization-maintaining full-reciprocity bidirectional microwave-over-fiber resonant system includes: a bidirectional optical amplifier, a narrowband bidirectional optical filter, a first photoelectric intensity modulator, an optical coupler, a fiber sensing ring working structure, a second photoelectric intensity modulator, a first regeneration cavity delay adjustment unit, a first high speed photodetector, a first microwave filtering and amplifying unit, a first microwave power divider, a second regeneration cavity delay adjustment unit, a second high speed photodetector, a second microwave filtering and amplifying unit, a third microwave power divider, and a microwave frequency difference detection unit;

the bidirectional optical amplifier, the narrowband bidirectional optical filter, the first photoelectric intensity modulator, the optical coupler, the fiber sensing ring working structure and the second photoelectric intensity modulator are connected in sequence to form a clockwise ring resonant cavity; resonant light in a clockwise direction passes sequentially through the optical coupler, the first regeneration cavity delay adjusting unit, the first high speed photodetector, the first microwave filtering and amplifying unit and the first microwave power divider to be input to the first photoelectric intensity modulator, so as to constitute a clockwise regenerative mode-locked structure; an electric signal generated by the clockwise regenerative mode-locked structure is input into the microwave frequency difference detection unit via the first microwave power divider.

The bidirectional optical amplifier, the second photoelectric intensity modulator, the fiber sensing ring working structure, the optical coupler, the first photoelectric intensity modulator and the narrowband bidirectional optical filter are connected in sequence to form a counterclockwise ring resonant cavity; resonant light in a counterclockwise direction passes through the optical coupler, the second regeneration cavity delay adjusting unit, the second high speed photodetector, the second microwave filtering and amplifying unit, the third microwave power divider in sequence to be input to the second photoelectric intensity modulator, so as to constitute a counterclockwise regenerative mode-locked structure; an electric signal generated by the counterclockwise regenerative mode-locked structure is input into the microwave frequency difference detection unit via the third microwave power divider.

The fiber sensing ring working structure comprises a polarization beam splitter, a fiber sensing ring, a first orthogonal polarization state adjustment unit and a second orthogonal polarization state adjustment unit.

The resonant light in a clockwise direction passes through the second orthogonal polarization state adjusting unit to adjust a double-peak spectral signal of the narrowband bidirectional optical filter into two paths of signals with perpendicular polarization states; the two paths of signals enter the fiber sensing ring via the polarization beam splitter and pass through the polarization beam splitter and the first orthogonal polarization state adjusting unit in turn to adjust the polarization states back to an initial state.

The resonant light in the counterclockwise direction sequentially passes through a first orthogonal polarization state adjustment unit to adjust the double-peak spectral signal of the narrowband bidirectional optical filter to two paths of signals with perpendicular polarization states; the two paths of signals enter the fiber sensing ring via the polarization beam splitter and pass through the polarization beam splitter and the second orthogonal polarization state adjustment unit in turn to adjust the polarization states back to the initial state.

Furthermore, in the polarization-maintaining full-reciprocity bidirectional microwave-over-fiber resonant system, the microwave signals generated by the clockwise regenerative mode-locked structure and the counterclockwise regenerative mode-locked structure are input into the microwave frequency difference detection unit to detect an angular velocity.

Furthermore, the narrowband bidirectional optical filter changes the resonant microwave-over-fiber signal when the system is operated into a double-peak spectral signal; wavelengths corresponding to spectral peaks are $\lambda_1$ and $\lambda_2$ respectively, and a frequency difference between $\lambda_1$ and $\lambda_2$ is a modulated signal $f_m$, to implement bidirectional dual-frequency resonance.

Furthermore, in the fiber sensing ring working structure, each of the first polarization state adjusting unit and the second orthogonal polarization state adjusting unit includes: several polarization beam splitters and polarization state controllers.

Furthermore, in the fiber sensing ring working structure, the two paths of signals with the perpendicular polarization states are transmitted in the fiber sensing ring along opposite directions at different light speeds, so as to increase a detection gain of Sagnac effect of the fiber sensing ring.

Furthermore, the first regeneration cavity delay adjusting unit and the second regeneration cavity delay adjusting unit act as an optical path adjusting unit, and each of the first regeneration cavity delay adjusting unit and the second regeneration cavity delay adjusting unit includes a fiber stretcher, a dimmable delay line or a spatial light displacement stage.

Furthermore, the system further comprises a cavity length control system, wherein the cavity length control system includes a cavity length adjuster, a second microwave power divider, a cavity length control unit and an external clock reference source; the cavity length adjuster is disposed in the clockwise ring resonant cavity and the counterclockwise ring resonant cavity, the first microwave power divider is inputted into the microwave frequency difference detection unit and the cavity length control unit respectively via the second microwave power divider, the external clock reference source is inputted into the cavity length control unit, and the cavity length control unit is connected to control the cavity length adjuster to keep a cavity length of the resonant cavity stable.

Furthermore, the cavity length adjuster comprises a first stage cavity length adjuster and a second stage cavity length adjuster; the first stage cavity length adjuster has a larger adjustment range than the second stage cavity length adjuster; wherein the first stage cavity length adjuster is used for slow adjustment of cavity length, the second stage cavity length adjuster is used for fast adjustment of cavity length, and the first stage cavity length adjuster and the second stage cavity length adjuster are used as an optical path adjustment unit and each of the first stage cavity length adjuster and the second stage cavity length adjuster includes a fiber stretcher, a dimmable delay line or a spatial light displacement stage.

A method for detecting an angular velocity by using the polarization-maintaining full-reciprocity bidirectional microwave-over-fiber resonant system comprises:

step 1: splitting an optical signal output by the bidirectional optical amplifier into two paths in clockwise and counterclockwise directions;

wherein working light in the clockwise direction passes through a clockwise ring resonant cavity and the clockwise regenerative mode-locked structure, so as to be stably output at a frequency f1 by the first microwave power divider;

working light in the counterclockwise direction passes through a counterclockwise ring resonant cavity and the counterclockwise regenerative mode-locked structure, so as to be stably output at a frequency f2 by the third microwave power divider;

step 2: generating opposite Sagnac effects in the fiber sensing ring working structure by the working light in the clockwise direction and the working light in the counterclockwise direction; and detecting a frequency difference between frequency f1 and the frequency f2 obtained in step 1 as a beat frequency, by the microwave frequency difference detection unit, wherein the frequency difference is recorded as $\Delta f$;

step 3: obtaining the rotational angular velocity $\Omega_r$ by a following formula:

$$\Omega_r = \frac{\lambda L}{4S} \frac{\Delta f}{G_1 + G_2},$$

where S is an area enclosed by the fiber sensing ring in the fiber sensing ring working structure, $\lambda$ is a wavelength corresponding to the frequency f1 or the frequency f2, and L is a total fiber length of the fiber sensing ring; $G_1$ is a gain generated due to Sagnac effect of the fiber sensing ring for two paths with perpendicular polarization states after the working light in the clockwise direction enters the fiber sensing ring; and $G_2$ is a gain generated due to Sagnac effect of the fiber sensing ring for two paths with perpendicular polarization states after the working light in the counterclockwise direction enters the fiber sensing ring.

Furthermore, when the polarization-maintaining full-reciprocity bidirectional microwave-over-fiber resonant system has a cavity length control system, frequency discrimination and phase discrimination are performed on the clockwise microwave frequency f1 assigned through the second microwave power divider with an external clock reference source, and an output signal passes through a cavity length control unit to control a cavity length regulator for clockwise resonant cavity length locking; in this case, a cavity length change of a counterclockwise resonant cavity is a sum of a cavity length change of a clockwise resonant cavity before the cavity length locking and the cavity length change of the counterclockwise resonant cavity before the cavity length locking.

The beneficial effects of the present disclosure are as below. In the present disclosure, bidirectional resonant technology is combined with conventional resonant optical gyroscope technology to construct a polarization-maintaining full-reciprocity bidirectional microwave-over-fiber resonant system based on the Sagnac effect principle. In the polarization-maintaining full-reciprocity bidirectional microwave-over-fiber resonant system, instead of conventional light wave oscillations, microwave oscillations with a high stability is obtained by polarization-maintaining bidirectional photoelectric oscillations, which is used for measuring the rotational angular velocity. An advantage of the present disclosure is that a difference-frequency detection can be performed on microwave signals by amplification frequency multiplication, and the difference-frequency detection signal has a higher signal-to-noise ratio compared to optical difference-frequency detection. Especially full-reciprocity optical cavity structures have a higher detection accuracy for resonant frequency difference between microwave signals in clockwise and counterclockwise directions. In addition, the system locks the photoelectric oscillation frequency in one of the directions, i.e., the resonant cavity length, onto a stable standard clock, which stabilizes the relative cavity length of the optical resonant cavity, eliminating temperature drift and optical parasitic noise of the fiber ring resonant cavity, further improving the output frequency stability. The system and method provided herein have high utility and high measurement accuracy that can meet the requirements of high precision optical gyroscope applications.

Figure 1:
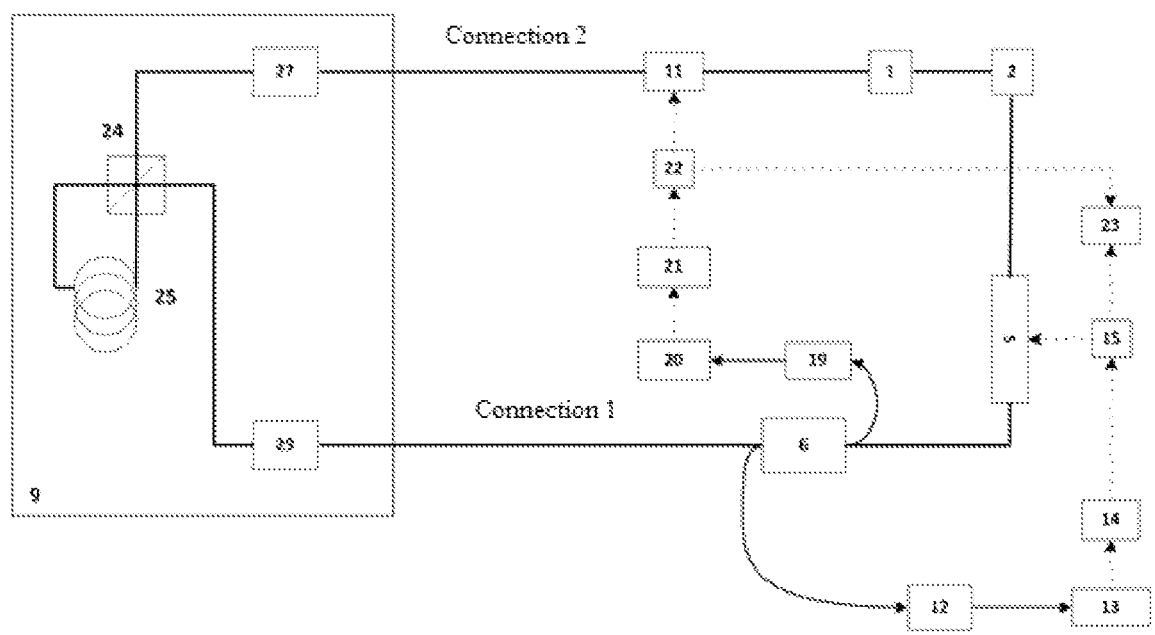
FIG. 1 is a composition block diagram of a polarization-maintaining full-reciprocity bidirectional microwave-over-fiber resonant system according to one embodiment of the present disclosure.

In the figures: bidirectional optical amplifier 1, narrowband bidirectional optical filter 2, first photoelectric intensity modulator 5, optical coupler 6, first stage cavity length regulator 7, second stage cavity length regulator 8, fiber sensing ring working structure 9, second photoelectric intensity modulator 11, first regeneration cavity delay adjustment unit 12, first high speed photodetector 13, first microwave filtering and amplifying unit 14, first microwave power divider 15, second microwave power divider 16, cavity length control unit 17, external clock reference source 18, second regeneration cavity delay adjustment unit 19, second high speed photodetector 20, second microwave filtering and amplifying unit 21, third microwave power divider 22, microwave frequency difference detection unit 23, polarization beam splitter 24, fiber sensing ring 25, first orthogonal polarization state adjustment unit 27, second orthogonal polarization state adjustment unit 29; the solid line parts in the figures represent light path connections, which and are light paths; and the dashed lines represent circuit connections, which are electrical paths.

DESCRIPTION OF EMBODIMENTS

The present disclosure will now be described in further detail with reference to the accompanying drawings and specific examples.

First Embodiment

As shown in FIG. 1, a polarization-maintaining full-reciprocity bidirectional microwave-over-fiber resonant system is provided according to an embodiment of the present disclosure. The system includes a bidirectional optical amplifier 1, a narrowband bidirectional optical filter 2, a first photoelectric intensity modulator 5, an optical coupler 6, a fiber sensing ring working structure 9, a second photoelectric intensity modulator 11, a first regeneration cavity delay adjustment unit 12, a first high speed photodetector 13, a first microwave filtering and amplifying unit 14, a first microwave power divider 15, a second regeneration cavity delay adjustment unit 19, a second high speed photodetector 20, a second microwave filtering and amplifying unit 21, a third microwave power divider 22, and a microwave frequency difference detection unit 23.

The bidirectional optical amplifier 1, the narrowband bidirectional optical filter 2, the first photoelectric intensity modulator 5, the optical coupler 6, the fiber sensing ring working structure 9 and the second photoelectric intensity modulator 11 are connected in sequence to form a clockwise ring resonant cavity. Resonant light in a clockwise direction passes sequentially through the optical coupler 6, the first regeneration cavity delay adjusting unit 12, the first high speed photodetector 13, the first microwave filtering and amplifying unit 14 and the first microwave power divider 15 to input to the first photoelectric intensity modulator 5, so as to constitute a clockwise regenerative mode-locked structure. An electric signal generated by the clockwise regenerative mode-locked structure is input into the microwave frequency difference detection unit 23 via the first microwave power divider 15.

The bidirectional optical amplifier 1, the second photoelectric intensity modulator 11, the fiber sensing ring working structure 9, the optical coupler 6, the first photoelectric intensity modulator 5 and the narrowband bidirectional optical filter 2 are connected in sequence to form a counterclockwise ring resonant cavity. Resonant light in a counterclockwise direction passes through the optical coupler 6, the second regeneration cavity delay adjusting unit 19, the second high speed photodetector 20, the second microwave filtering and amplifying unit 21, the third microwave power divider 22 in sequence to input to the second photoelectric intensity modulator 11, so as to constitute a counterclockwise regenerative mode-locked structure. An electric signal generated by the counterclockwise regenerative mode-locked structure is input into the microwave frequency difference detection unit 23 via the third microwave power divider 22.

Light output by the bidirectional optical amplifier 1 in two directions respectively passes through the clockwise ring resonant cavity and counterclockwise ring resonant cavity, and finally returns to the bidirectional optical amplifier 1 to complete resonance amplification. Thus, the system has a full reciprocity structure.

The fiber sensing ring working structure 9 includes a polarization beam splitter 24, a fiber sensing ring 25, a first orthogonal polarization state adjustment unit 27 and a second orthogonal polarization state adjustment unit 29.

The resonant light in the clockwise direction passes through the second orthogonal polarization state adjusting unit 29 to separate the double-peak spectral signal of the narrowband bidirectional optical filter 2 into two paths of optical signals with perpendicular polarization states. The central wavelengths of the two paths of optical signals are respectively $\lambda_1$ and $\lambda_2$. The two paths of signals with the central wavelengths $\lambda_1$ and $\lambda_2$ separated by the polarization beam splitter 24 enter the fiber sensing ring 25 to sense the angular velocity, and are then combined through the polarization beam splitter 24. The combined light pass through the first orthogonal polarization state adjusting unit 27, to obtain the output signal of the fiber sensing ring working structure 9 which has a consistent polarization state with the input signal.

The resonant light in the counterclockwise direction passes through the first orthogonal polarization state adjusting unit 27 to separate the double-peak spectral signal of the narrowband bidirectional optical filter 2 into two paths of optical signals with perpendicular polarization states. The central wavelengths of the two paths of optical signals are respectively $\lambda_1$ and $\lambda_2$. The two paths of signals with the central wavelengths $\lambda_1$ and $\lambda_2$ separated by the polarization beam splitter 24 enter the fiber sensing ring 25 to sense the angular velocity, and are then combined through the polarization beam splitter 24. The combined light pass through the second orthogonal polarization state adjusting unit 29, to obtain the output signal of the fiber sensing ring working structure 9 which has a consistent polarization state with the input signal.

The microwave signals generated by the clockwise regenerative mode-locked structure and the counterclockwise regenerative mode-locked structure are input into the microwave frequency difference detection unit 23 to detect the angular velocity. The angular velocity detection accuracy of the system is improved by adopting microwave frequency detection.

The first regeneration cavity delay adjusting unit 12 and the second regeneration cavity delay adjusting unit 19 act as an optical path adjusting unit. Each of the first regeneration cavity delay adjusting unit 12 and the second regeneration cavity delay adjusting unit 19 includes a fiber stretcher, a dimmable delay line or a spatial light displacement stage.

The narrowband bidirectional optical filter 2 changes the resonant microwave-over-fiber signal when the system is operated into a double-peak spectral signal; wavelengths corresponding to the spectral peaks are $\lambda_1$ and $\lambda_2$ respectively, and a frequency difference between $\lambda_1$ and $\lambda_2$ is a modulating signal $f_m$, thereby achieving bidirectional dual-frequency resonance.

In the fiber sensing ring working structure 9, the first polarization state adjusting unit 27 and the second orthogonal polarization state adjusting unit 29 are implemented by several polarization beam splitters and polarization state controllers.

In the fiber sensing ring working structure 9, the two paths of optical signals $\lambda_1$ and $\lambda_2$, which enter and transmit in the sensing ring in the clockwise direction, have different light speeds when being transmitted in the sensing ring in opposite directions after polarization state separation, thereby increasing a detection gain of Sagnac effect of the sensing ring. Similarly, the two paths of optical signals $\lambda_1$ and $\lambda_2$ which enter and transmit in the sensing ring in the counterclockwise direction also increase the detection gain of the Sagnac effect of the sensing ring when being transmitted in the sensing ring in opposite directions.

The optical path differences (phase differences) generated by the Sagnac effect in the clockwise and counterclockwise resonant cavities have opposite signs, resulting in that the optical path difference in clockwise and counterclockwise directions is twice the optical path difference caused by a Sagnac effect of an unidirectional resonant cavity.

A method for detecting an angular velocity by using a polarization-maintaining full-reciprocity bidirectional microwave-over-fiber resonant system comprises the steps of:

Step 1: an output optical signal of the bidirectional optical amplifier 1 is split into two paths in clockwise and counterclockwise directions.

The working light in the clockwise direction is first narrowband-filtered by the narrowband bidirectional optical filter 2, and then is split into two paths through the first photoelectric intensity modulator 5 and the optical coupler 6 in sequence. The first path continues to pass through the fiber sensing ring working structure 9, then passes through the second photoelectric intensity modulator 11, and is amplified again through the bidirectional optical amplifier 1 to form a clockwise optical resonant loop. The second path of the optical signal passes through the first regeneration cavity delay adjustment unit 12, and then is subjected to photoelectric conversion via a first high speed photodetector 13. The microwave signal generated from the photoelectric conversion is filtered, frequency-selected and amplified via a first microwave filtering and amplification unit 14. After subjecting to power distribution via a first microwave power divider 15, one path enters a first photoelectric intensity modulator 5 to form a clockwise regenerative mode-locked structure. The first regeneration cavity delay adjustment unit 12 before the first high speed photodetector 13 can be adjusted to change the microwave phase injected by the regenerative mode-locked loop into the first photoelectric intensity modulator 5 to achieve a stable output at a frequency of f1.

The working light in the counterclockwise direction first passes through the second photoelectric intensity modulator 11, and then is split into two paths after passing through the fiber sensing ring working structure 9 and the optical coupler 6 in sequence. The first path continues to pass through the first photoelectric intensity modulator 5 back to the narrowband bidirectional optical filter 2 for performing the narrowband filtering, and then amplified through the bidirectional optical amplifier 1 again to form a counterclockwise optical resonant loop. The second path passes through the second regeneration cavity delay adjustment unit 19, and then is subjected to photoelectric conversion via a second high speed photodetector 20. The microwave signal generated from the photoelectric conversion is subjected to microwave frequency selection and amplification by a second microwave filtering and amplification unit 2, and power distribution by a third microwave power divider 22. One path enters a second photoelectric intensity modulator 11 to form a regenerative mode-locked structure. The second regeneration cavity delay adjusting unit 19 before the second high speed photodetector 20 can be adjusted to change the microwave phase injected by the regenerative mode-locked loop into the second photoelectric intensity modulator 11 to achieve a stable output at a frequency of f2.

Step 2: the working light in the clockwise direction and the working light in the counterclockwise direction generate opposite Sagnac effects in the fiber sensing ring working structure 9, and the microwave frequency difference detection unit 23 detects a frequency difference, i.e., a beat frequency, between the frequency f1 and the frequency f2 obtained in step 1, which is recorded as $\Delta f$.

step 3: the rotational angular velocity $\Omega_r$ is obtained by the following formula:

$$\Omega_r = \frac{\lambda L}{4S} \frac{\Delta f}{G_1 + G_2},$$

where S is an area enclosed by the fiber sensing ring in the fiber sensing ring working structure, $\lambda$ is a wavelength corresponding to the frequency f1 or the frequency f2, and L is a total fiber length of the fiber sensing ring; $G_1$ is a gain generated due to sensing to the Sagnac effect of two paths with perpendicular polarization states after the working light in the clockwise direction enters the fiber sensing ring; and $G_2$ is a gain generated due to sensing to the Sagnac effect of two paths with perpendicular polarization states after the working light in the counterclockwise direction enters the fiber sensing ring.

Second Embodiment

Figure 2:
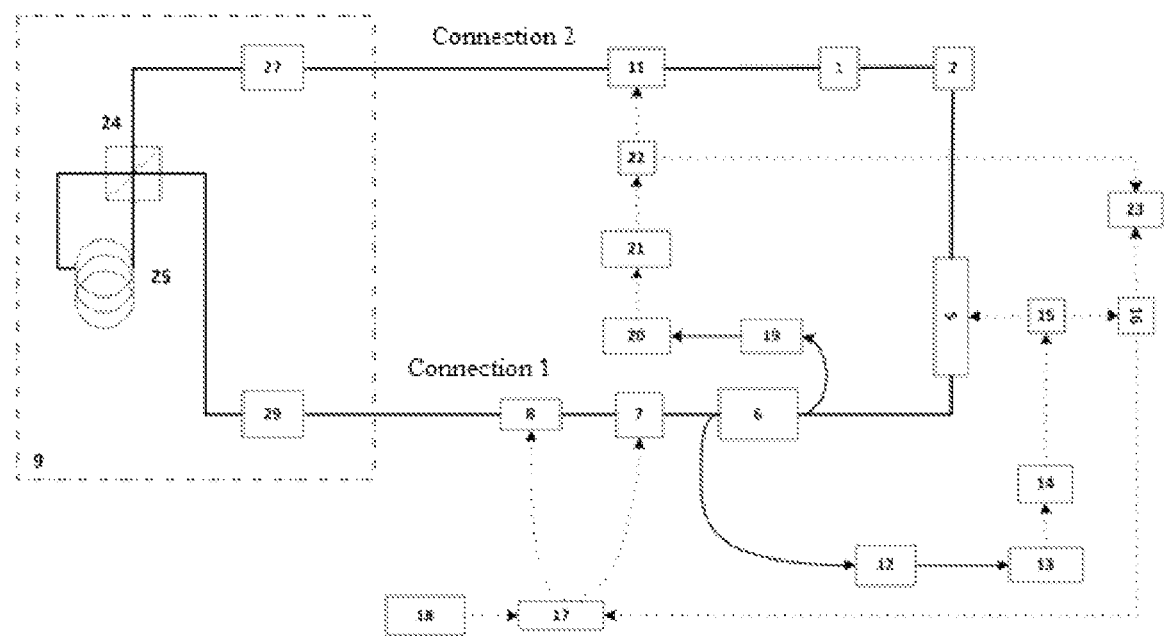
FIG. 2 is a composition block diagram of a polarization-maintaining full-reciprocity bidirectional microwave-over-fiber resonant system according to another embodiment of the present disclosure.

As shown in FIG. 2, a polarization-maintaining full-reciprocity bidirectional microwave-over-fiber resonant system is provided according to an embodiment. Based on the first embodiment, the polarization-maintaining full-reciprocity bidirectional microwave-over-fiber resonant system further includes a cavity length control system, which includes a cavity length adjuster, a second microwave power divider 16, a cavity length control unit 17 and an external clock reference source 18.

The cavity length adjuster is arranged in the bidirectional ring resonant cavity. The output of the first microwave power divider 15 is input into the microwave frequency difference detection unit 23 and the cavity length control unit 17 respectively via the second microwave power divider 16. The external clock reference source 18 is input into the cavity length control unit connected to the cavity length adjuster to achieve the cavity length stabilization of the resonant cavity.

Further, the cavity length adjuster includes a first stage cavity length adjuster 7 and a second stage cavity length adjuster 8. The first stage cavity length adjuster 7 has a larger adjustment range than the second stage cavity length adjuster 8. The first stage cavity length adjuster 7 is used for slow adjustment of the cavity length, and the second stage cavity length adjuster 8 is used for fast adjustment of the cavity length. The first stage cavity length adjuster 7 and the second stage cavity length adjuster 8 are used as an optical path adjustment unit, each of which may employ a fiber stretcher, a dimmable delay line, or a spatial light displacement stage.

Frequency discrimination and phase discrimination are performed on the external clock reference source 18 and the clockwise microwave frequency f1 assigned through the second microwave power divider 16. An output signal passes through a cavity length control unit 17 for controlling a cavity length regulator to implement the clockwise resonant cavity length locking. In this case, a counterclockwise resonant cavity length change is a sum of a clockwise resonant cavity length change before the cavity length locking and a counterclockwise resonant cavity length change before the cavity length locking.

Those skilled in the art will readily be able to make numerous variations and modifications from the written description, the drawings, and the claims provided herein without departing from the spirit and scope of the disclosure as defined in the claims. Any modifications and equivalent variations made to the above-described embodiments according to the technical idea and essence of the present disclosure fall within the scope of protection defined in the claims of the present disclosure.

What is claimed is:

1. A polarization-maintaining full-reciprocity bidirectional microwave-over-fiber resonant system, comprising a bidirectional optical amplifier (1), a narrowband bidirectional optical filter (2), a first photoelectric intensity modulator (5), an optical coupler (6), a fiber sensing ring working structure (9), a second photoelectric intensity modulator (11), a first regeneration cavity delay adjustment unit (12), a first high speed photodetector (13), a first microwave filtering and amplifying unit (14), a first microwave power divider (15), a second regeneration cavity delay adjustment unit (19), a second high speed photodetector (20), a second microwave filtering and amplifying unit (21), a third microwave power divider (22), and a microwave frequency difference detection unit (23);

wherein the bidirectional optical amplifier (1), the narrowband bidirectional optical filter (2), the first photoelectric intensity modulator (5), the optical coupler (6), the fiber sensing ring working structure (9) and the second photoelectric intensity modulator (11) are connected in sequence to form a clockwise ring resonant cavity; resonant light in a clockwise direction passes sequentially through the optical coupler (6), the first regeneration cavity delay adjusting unit (12), the first high speed photodetector (13), the first microwave filtering and amplifying unit (14) and the first microwave power divider (15) to be input to the first photoelectric intensity modulator (5), so as to constitute a clockwise regenerative mode-locked structure; an electric signal generated by the clockwise regenerative mode-locked structure is input into the microwave frequency difference detection unit (23) via the first microwave power divider (15);

wherein the bidirectional optical amplifier (1), the second photoelectric intensity modulator (11), the fiber sensing ring working structure (9), the optical coupler (6), the first photoelectric intensity modulator (5) and the narrowband bidirectional optical filter (2) are connected in sequence to form a counterclockwise ring resonant cavity; resonant light in a counterclockwise direction passes through the optical coupler (6), the second regeneration cavity delay adjusting unit (19), the second high speed photodetector (20), the second microwave filtering and amplifying unit (21), the third microwave power divider (22) in sequence to be input to the second photoelectric intensity modulator (11), so as to constitute a counterclockwise regenerative mode-locked structure; an electric signal generated by the counterclockwise regenerative mode-locked structure is input into the microwave frequency difference detection unit (23) via the third microwave power divider (22);

the fiber sensing ring working structure (9) comprises a polarization beam splitter (24), a fiber sensing ring (25), a first orthogonal polarization state adjustment unit (27) and a second orthogonal polarization state adjustment unit (29);

the resonant light in the clockwise direction passes through the second orthogonal polarization state adjusting unit (29) to adjust a double-peak spectral signal of the narrowband bidirectional optical filter (2) into two paths of signals with perpendicular polarization states; the two paths of signals enter the fiber sensing ring (25) via the polarization beam splitter (24) and pass through the polarization beam splitter (24) and the first orthogonal polarization state adjusting unit (27) in turn to adjust the polarization states back to an initial state; and the resonant light in the counterclockwise direction sequentially passes through a first orthogonal polarization state adjustment unit (27) to adjust the double-peak spectral signal of the narrowband bidirectional optical filter (2) to two paths of signals with perpendicular polarization states; the two paths of signals enter the fiber sensing ring (25) via the polarization beam splitter (24) and pass through the polarization beam splitter (24) and the second orthogonal polarization state adjustment unit (29) in turn to adjust the polarization states back to the initial state.

2. The polarization-maintaining full-reciprocity bidirectional microwave-over-fiber resonant system according to claim 1, wherein the microwave signals generated by the clockwise regenerative mode-locked structure and the counterclockwise regenerative mode-locked structure are input into the microwave frequency difference detection unit (23) to detect an angular velocity.

3. The polarization-maintaining full-reciprocity bidirectional microwave-over-fiber resonant system according to claim 1, wherein the narrowband bidirectional optical filter (2) changes the resonant microwave-over-fiber signal when the system is operated into a double-peak spectral signal; wavelengths corresponding to spectral peaks are $\lambda_1$ and $\lambda_2$ respectively, and a frequency difference between $\lambda_1$ and $\lambda_2$ is a modulating signal $f_m$, to implement bidirectional dual-frequency resonance.

4. The polarization-maintaining full-reciprocity bidirectional microwave-over-fiber resonant system according to claim 1, wherein in the fiber sensing ring working structure (9), each of the first polarization state adjusting unit (27) and the second orthogonal polarization state adjusting unit (29) includes a plurality of polarization beam splitters and a plurality of polarization state controllers.

5. The polarization-maintaining full-reciprocity bidirectional microwave-over-fiber resonant system according to claim 1, wherein in the fiber sensing ring working structure (9), two paths of signals with perpendicular polarization states are transmitted in the sensing ring at different light speeds, so as to increase a detection gain of Sagnac effect of the fiber sensing ring.

6. The polarization-maintaining full-reciprocity bidirectional microwave-over-fiber resonant system according to claim 1, wherein the first regeneration cavity delay adjusting unit (12) and the second regeneration cavity delay adjusting unit (19) act as an optical path adjusting unit, and each of the first regeneration cavity delay adjusting unit and the second regeneration cavity delay adjusting unit includes a fiber stretcher, a dimmable delay line or a spatial light displacement stage.

7. The polarization-maintaining full-reciprocity bidirectional microwave-over-fiber resonant system according to claim 1, further comprising a cavity length control system, wherein the cavity length control system comprises a cavity length adjuster, a second microwave power divider (16), a cavity length control unit (17) and an external clock reference source (18); wherein the cavity length adjuster is disposed in the clockwise ring resonant cavity and the counterclockwise ring resonant cavity, the first microwave power divider (15) is inputted into the microwave frequency difference detection unit (23) and the cavity length control unit (17) respectively via the second microwave power divider (16), the external clock reference source (18) is inputted into the cavity length control unit (17), and the cavity length control unit (17) is connected to control the cavity length adjuster to keep a cavity length of the resonant cavity stable.

8. The polarization-maintaining full-reciprocity bidirectional microwave-over-fiber resonant system according to claim 7, wherein the cavity length adjuster comprises a first stage cavity length adjuster (7) and a second stage cavity length adjuster (8); the first stage cavity length adjuster (7) has a larger adjustment range than the second stage cavity length adjuster (8); wherein the first stage cavity length adjuster (7) is used for slow adjustment of cavity length, the second stage cavity length adjuster (8) is used for fast adjustment of cavity length, and the first stage cavity length adjuster (7) and the second stage cavity length adjuster (8) are used as an optical path adjustment unit, and each of the first stage cavity length adjuster and the second stage cavity length adjuster comprises a fiber stretcher, a dimmable delay line or a spatial light displacement stage.

9. A method for detecting an angular velocity by using the polarization-maintaining full-reciprocity bidirectional microwave-over-fiber resonant system according to claim 1, comprising steps of:
Step 1: splitting an optical signal output by the bidirectional optical amplifier (1) into two paths in a clockwise direction and a counterclockwise direction;
wherein working light in the clockwise direction passes through the clockwise ring resonant cavity and the clockwise regenerative mode-locked structure, so as to be stably output at a frequency f1 by the first microwave power divider (15);
working light in the counterclockwise direction passes through the counterclockwise ring resonant cavity and the counterclockwise regenerative mode-locked structure, so as to be stably output at a frequency f2 by the third microwave power divider (22);
step 2: generating opposite Sagnac effects in the fiber sensing ring working structure (9) by the working light in the clockwise direction and the working light in the counterclockwise direction, and detecting a frequency difference between frequency f1 and the frequency f2 obtained in step 1 as a beat frequency by the microwave frequency difference detection unit (23), wherein the frequency difference is recorded as $\Delta f$;
step 3: obtaining the rotational angular velocity $\Omega_r$ by a following formula:

$$\Omega_r = \frac{\lambda L}{4S} \frac{\Delta f}{G_1 + G_2},$$

wherein S is an area enclosed by the fiber sensing ring in the fiber sensing ring working structure, $\lambda$ is a wavelength corresponding to the frequency f1 or the frequency f2, and L is a total fiber length of the fiber sensing ring; $G_1$ is a gain generated due to sensing to the Sagnac effect of two paths with perpendicular polarization states after the working light in the clockwise direction enters the fiber sensing ring; and $G_2$ is a gain generated due to sensing to the Sagnac effect of two paths with perpendicular polarization states after the working light in the counterclockwise direction enters the fiber sensing ring.

10. The method according to claim 9, wherein when the polarization-maintaining full-reciprocity bidirectional microwave-over-fiber resonant system has a cavity length control system, frequency discrimination and phase discrimination are performed on the clockwise microwave frequency f1 assigned through the second microwave power divider (16) with an external clock reference source (18), and an output signal passes through a cavity length control unit (17) to control a cavity length regulator for clockwise resonant cavity length locking; and a cavity length change of the counterclockwise resonant cavity is a sum of a cavity length change of the clockwise resonant cavity before a cavity length locking and a cavity length change of the counterclockwise resonant cavity before the cavity length locking.

* * * * *